(12) United States Patent
Figa

(10) Patent No.: US 10,464,794 B2
(45) Date of Patent: Nov. 5, 2019

(54) APPARATUS AND METHOD FOR GRIPPING A CONTAINER DURING LID OPENING

(71) Applicant: Romek Figa, Hanover, MA (US)

(72) Inventor: Romek Figa, Hanover, MA (US)

( * ) Notice: Subject to any disclaimer, the term of this patent is extended or adjusted under 35 U.S.C. 154(b) by 81 days.

(21) Appl. No.: 15/296,479

(22) Filed: Oct. 18, 2016

(65) Prior Publication Data

US 2017/0283231 A1 Oct. 5, 2017

Related U.S. Application Data

(60) Provisional application No. 62/317,837, filed on Apr. 4, 2016, provisional application No. 62/341,884, filed on May 26, 2016.

(51) Int. Cl.
| | |
|---|---|
| *B67B 7/18* | (2006.01) |
| *F16B 2/06* | (2006.01) |
| *F16B 2/10* | (2006.01) |
| *F16B 2/12* | (2006.01) |
| *F16B 2/18* | (2006.01) |
| *F16M 13/02* | (2006.01) |

(52) U.S. Cl.
CPC ............. *B67B 7/18* (2013.01); *F16B 2/065* (2013.01); *F16B 2/10* (2013.01); *F16B 2/12* (2013.01); *F16B 2/185* (2013.01); *F16M 13/022* (2013.01)

(58) Field of Classification Search
CPC .... B67B 7/18; F16B 2/065; F16B 2/10; F16B 2/12; F16B 2/185; F16M 13/022
USPC ......................................................... 81/3.32
See application file for complete search history.

(56) References Cited

U.S. PATENT DOCUMENTS

| | | | | |
|---|---|---|---|---|
| 515,983 A | * | 3/1894 | Winchester | B67B 7/34 30/436 |
| 630,734 A | | 8/1899 | Oothout | |
| 648,763 A | * | 5/1900 | La Barge | B67B 7/34 279/114 |
| 710,606 A | * | 10/1902 | Pagett | B67B 7/18 81/3.32 |

(Continued)

FOREIGN PATENT DOCUMENTS

GB  2 227 968  8/1990

OTHER PUBLICATIONS

International Search Report—Application No. PCT/US2017/023745, dated Jul. 7, 2017, 9 pages, together with the Written Opinion of the International Searching Authority.

*Primary Examiner* — Hadi Shakeri
(74) *Attorney, Agent, or Firm* — Sunstein Kann Murphy & Timbers LLP

(57) ABSTRACT

An apparatus for grasping a jar and aiding in lid opening includes a base element that may be placed on a surface, and a top housing that is rotatably secured to the base element. A spiral guide element located between the base element and the top housing includes at least one spiral groove. One or more jaw members may be moveably secured to the top housing, and have a protrusion located within the spiral groove(s). The rotation of the top housing in a first direction (with respect to the base element) causes at least one of the jaw members to move radially inward with respect to the axis to engage a base of container. The rotation of the top housing in a second direction causes at least one jaw member to move radially outward with respect to the axis to disengage with the base of the container.

20 Claims, 15 Drawing Sheets

(56) References Cited

U.S. PATENT DOCUMENTS

| | | | | |
|---|---|---|---|---|
| 826,294 | A | * | 7/1906 | Waldschmidt ....... A47B 81/007 24/486 |
| 936,927 | A | | 10/1909 | McCallum |
| 1,227,738 | A | | 5/1917 | Bellis |
| 1,394,388 | A | * | 10/1921 | Wisenberg ................ B67B 7/18 279/71 |
| 1,424,607 | A | | 8/1922 | Wisenberg |
| 1,456,525 | A | * | 5/1923 | West ........................ B67B 7/32 24/524 |
| 1,781,997 | A | | 11/1930 | Berezowski |
| 1,912,500 | A | | 6/1933 | Rutledge |
| 2,569,239 | A | | 9/1951 | Holmen |
| 2,732,740 | A | | 1/1956 | Holmen |
| 3,008,618 | A | | 11/1961 | Watts |
| 3,891,171 | A | * | 6/1975 | Samuelian ............... A21C 1/02 248/131 |
| 4,102,226 | A | | 7/1978 | McGuire |
| 4,222,577 | A | * | 9/1980 | Giffin ................ B23B 31/16004 269/156 |
| 4,836,482 | A | | 6/1989 | Sokol |
| 5,129,715 | A | | 7/1992 | Maynard |
| 5,209,142 | A | | 5/1993 | Dickson |
| 5,348,276 | A | | 9/1994 | Blacker |
| 5,450,690 | A | | 9/1995 | Elsea |
| 6,205,888 | B1 | | 3/2001 | Laudani |
| 6,425,305 | B2 | * | 7/2002 | Gasparre .................. B67B 7/18 81/3.32 |
| 7,100,473 | B2 | | 9/2006 | Hefti et al. |
| 7,395,775 | B2 | | 7/2008 | LaScala |
| 8,820,548 | B2 | * | 9/2014 | Wilson .................. A47D 1/008 108/25 |
| 2002/0185800 | A1 | | 12/2002 | Duncan |
| 2005/0229750 | A1 | | 10/2005 | Duke |
| 2011/0061497 | A1 | * | 3/2011 | Jedrzejewski ............ B67B 7/18 81/3.4 |
| 2017/0284596 | A1 | | 10/2017 | Figa |

\* cited by examiner

APPARATUS AND METHOD FOR GRIPPING A CONTAINER DURING LID OPENING

PRIORITY

This application claims priority from U.S. Provisional Patent Application 62/317,837, filed Apr. 4, 2016, entitled "Apparatus and Method for Gripping a Container During Lid Opening," and naming Romek Figa as inventor, the disclosure of which is incorporated herein, in its entirety by reference.

This application also claims priority from U.S. Provisional Patent Application 62/341,884, filed May 26, 2016, entitled "Apparatus and Method For Gripping a Container For Lid Opening," and naming Romek Figa as inventor, the disclosure of which is incorporated herein, in its entirety by reference.

RELATED U.S. APPLICATIONS

This patent application is related to U.S. patent application Ser. No. 15/296,502, entitled "Apparatus and Method For Gripping a Container For Lid Opening," naming Romek Figa as inventor, filed on even date herewith, the disclosure of which is incorporated herein, in its entirety, by reference.

TECHNICAL FIELD

The present invention relates to opening container lids, and more particularly to devices and methods that grasp a container during lid opening

BACKGROUND ART

Many food products are packaged, shipped and purchased in glass or plastic jars with a screw-on lid that needs to be removed in order to access the contents of the jar. In order to maintain the freshness and cleanliness of the product within the container, the lids are often times thoroughly tightened and sometimes vacuum sealed. This, in turn, makes the lids difficult to remove. The struggle to remove the lid is greater for those individuals suffering from arthritis or dexterity issues, and the task of holding the container in one hand and twisting off the very tight lid becomes very difficult if not nearly impossible

SUMMARY OF THE EMBODIMENTS

In accordance with one embodiment of the invention, an apparatus for grasping a jar and aiding in lid opening includes a base element configured to be placed on a surface, and a top housing rotatably secured to the base element. The top housing may rotate about an axis with respect to the base element. The apparatus may also include a spiral guide element and a plurality of jaw elements. The spiral guide element is located between the base element and the top housing and includes at least one spiral groove. The jaw members may be moveably secured to the top housing, and each of the jaw members may have a protrusion located within the spiral groove(s) such that the protrusion(s) may move along the spiral groove(s). Rotation of the top housing in a first direction (e.g., counter clock wise) may cause at least one of the jaw members to move radially inward with respect to the axis to engage a base of container. Rotation of the top housing in a second direction may cause at least one jaw member to move radially outward with respect to the axis to disengage with the base of the container.

In some embodiments, the apparatus may also include at least one engagement member that is located on the base element and may engage the surface (e.g., to hold the apparatus in place during rotation of the top housing). For example, the engagement member(s) may include a plurality of feet members located on an underside of the base element. The feet members may contact the surface and/or increase the friction between the apparatus and the surface to hold the apparatus in place during rotation of the top housing. Additionally or alternatively, the engagement members may be suction cups or vacuum cups that stick to/suction to the surface.

In other embodiments, the apparatus may include at least one leg member that extends from the base element and engages an edge of the surface during rotation of the top housing. The leg member(s) may engage the edge of the surface during removal of a lid from the container. For example, the leg members may include a first leg member and a second leg member. The first leg member may be nearer a first end of the base element, and the second leg member may be located nearer a second end of the base element. In such embodiments, the first leg element is configured to engage the edge of the surface during rotation of the top housing in a first direction, and the second leg member configured to engage the edge of the surface during rotation of the top housing in a second direction.

Each jaw member may include a body portion, and the protrusion may extend from the bottom of the body portion. Additionally or alternatively, the top housing may include a plurality of slots extending through the top housing, and each of the protrusions may extend through one of the slots and into the spiral groove(s). For example, there may be a plurality of spiral grooves and the protrusion from each of the jaw members may be located in a dedicated spiral groove. In some embodiments, the spiral element may include an opening extending through it, and the top housing may have a protrusion extending downward and through the opening to allow the top housing to rotate about the axis and with respect to the spiral guide element and the base member. Each jaw member may include a resilient member that grasps the base of the container.

In accordance with other embodiments, the device may include a brace member that is removably secured to the base element. The brace member may have a horizontal portion configured to rest on the surface, and a vertical portion configured to engage the edge of the surface to prevent rotation of the device during use. The brace member may also include post member(s) extending from the horizontal portion and into hole(s) in the base element when the brace member is secured to the device. The brace member may also have a hinge between the horizontal portion and the vertical portion. The hinge may allow the horizontal portion and vertical portion to move relative to one another.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Illustrative embodiments of the present invention provide a jar gripping device that aids in the removal of a lid from the jar. The device has a rotatable housing and a number of jaws that move inward to grasp and hold the jar. Once the jaws grasp the jar, the user is then free to use both hands to remove the lid. Details of the illustrative embodiments are discussed in greater detail below.

Figure 1:
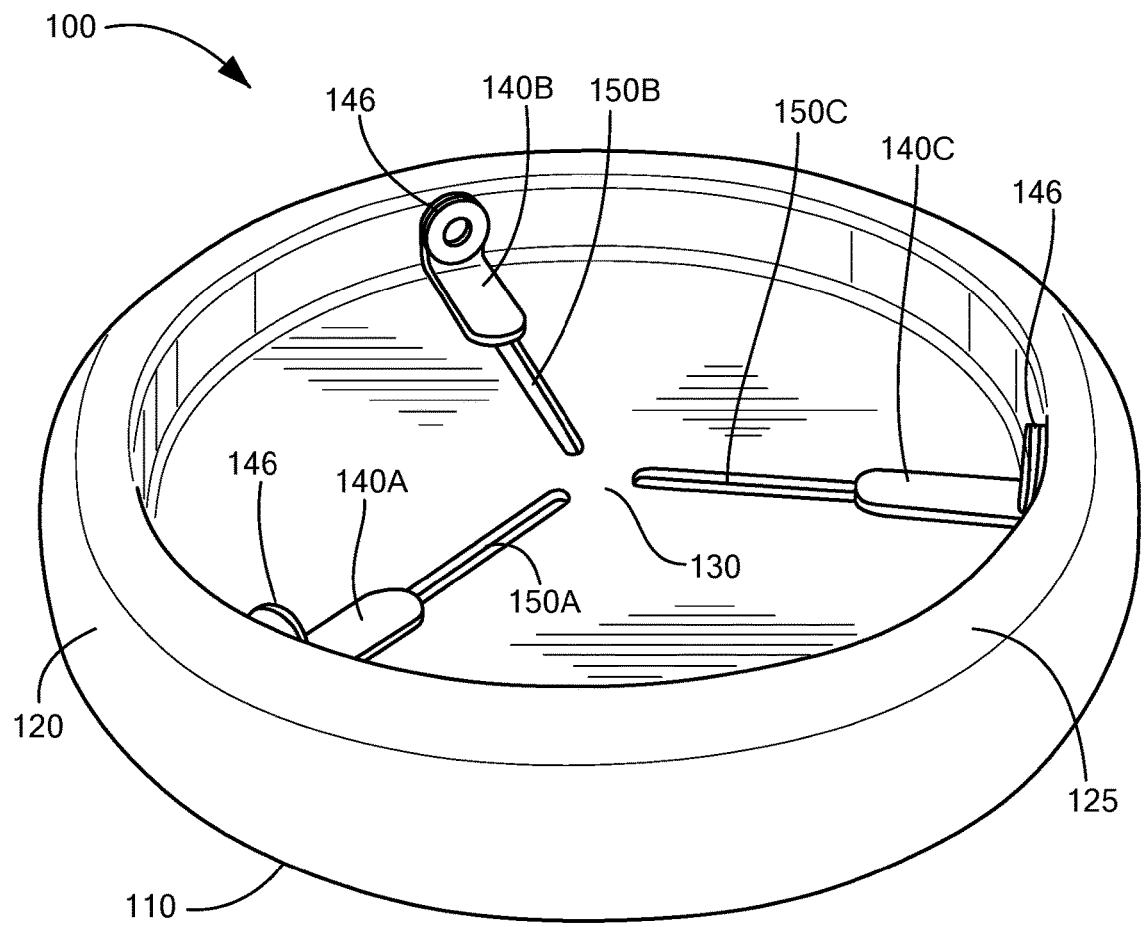
FIG. 1 schematically shows a perspective view of a jar gripping device in accordance with embodiments of the present invention.
Figure 2:
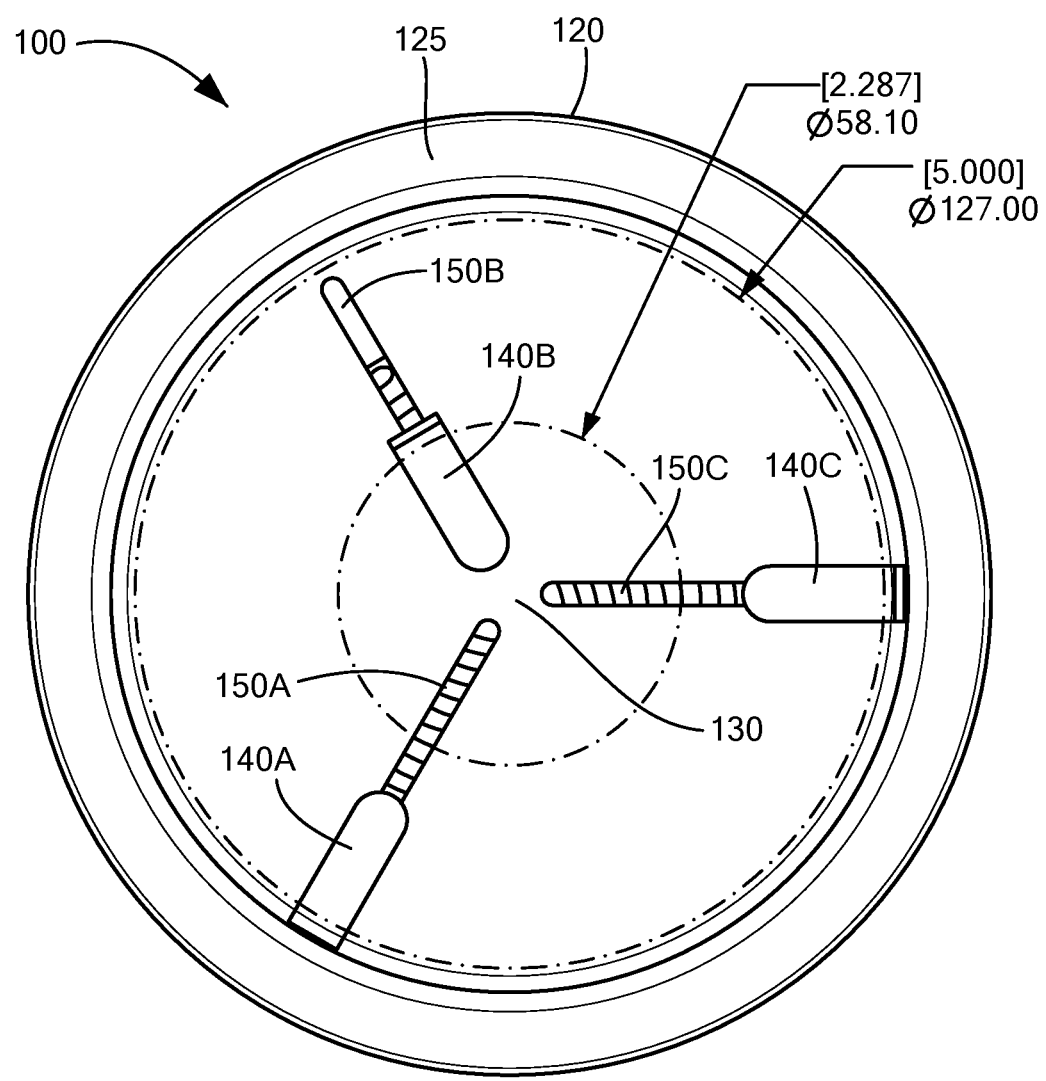
FIG. 2 schematically shows a top view of the jar gripping device of FIG. 1 in accordance with embodiments of the present invention.
Figure 3:
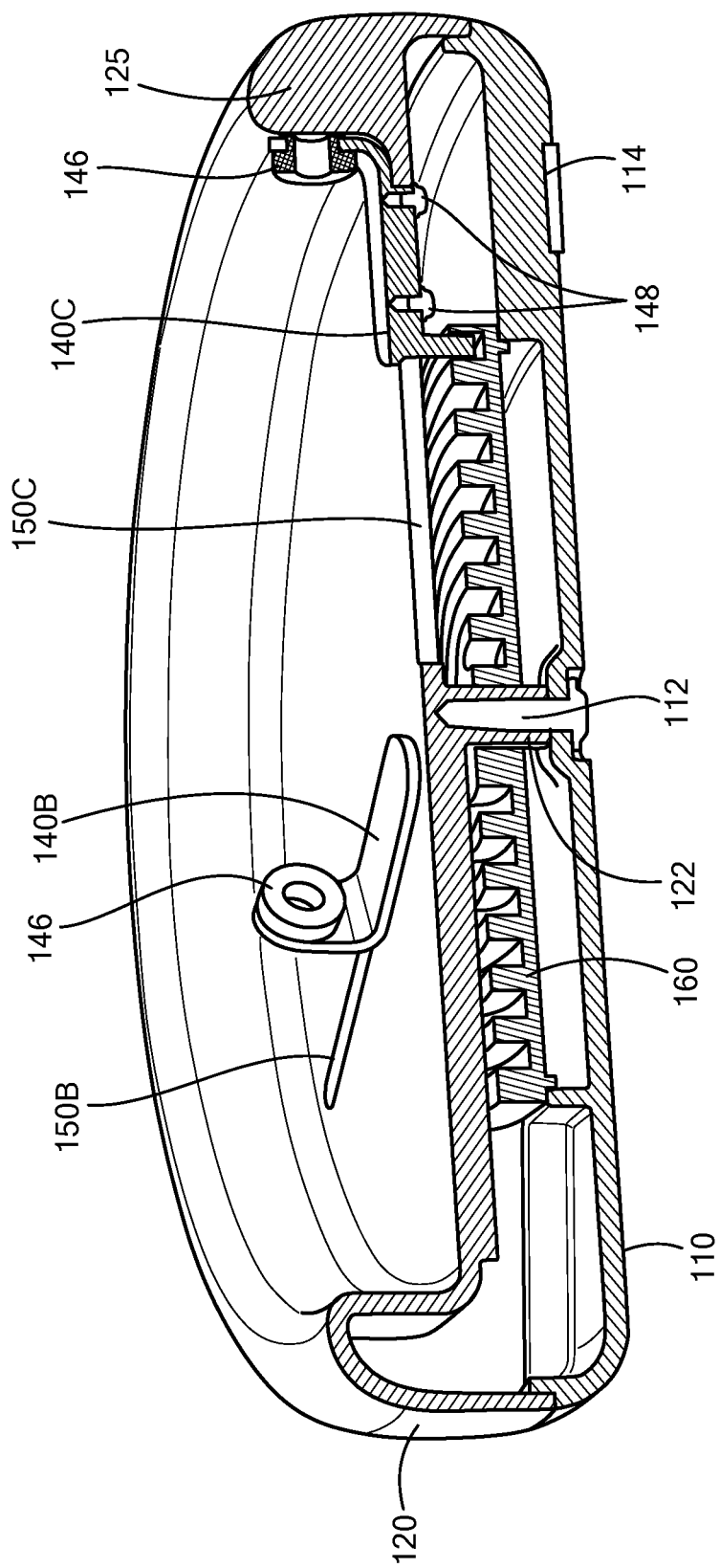
FIG. 3 is a cross-sectional view of the jar gripping device of FIG. 1, in accordance with embodiments of the present invention.

FIG. 1 schematically shows one illustrative embodiment of a jar gripping and securing device 100. As shown in FIGS. 1 and 2, the jar gripping device 100 includes a base 110 that, when the device 100 is in use, rests on a surface (e.g., a kitchen countertop, table, desk, etc.) on which the user wishes to open the jar/container. The base 110 may include a number of features that stabilize the device 100 on the surface and prevent the device 100 from moving as the user operates the device 100 and/or removes the lid from the jar. For example, as best shown in FIG. 3, the base 110 may include a number of feet 114 (e.g., two, three, four, five or more than five feet) located on the bottom of the base 110. The feet 114 (e.g., engagement members) may be rubber (or similar material) such that when the device 100 is resting on the kitchen surface, the feet 114 may grip the surface and prevent the device 100 from sliding/rotating. Additionally or alternatively, the base 110 may include one or more vacuum or suction cups that suction to the kitchen surface to prevent the device 100 from moving during use.

Residing on top of the base 110, the device 100 may have a top housing 120 that provides a surface 130 on which the jar to be opened may be placed. The top housing 120 may be flat or, as shown in FIGS. 1 and 3, may have a raised outer periphery 125. This raised outer periphery 125 provided a surface by which the user may grab the device 100 and also helps to prevent any jars/containers sitting on the surface 130 from sliding off the device 100 and onto the floor, countertop, table, etc.

As discussed in greater detail below, the top housing 120 may rotate about an axis and with respect to the base portion 110 to adjust the location of several jaw members 140A/140B/140C that grasp and hold the jar/container in place. To that end, and as best shown in FIG. 3, the top housing 120 may have projection 122 that extends from an inner surface of the top housing and toward the base member 110. This projection 122 may be placed over a protrusion or screw member 112 extending upward from (and/or through) the base member 110 to hold the top housing 120 in place on the base member 110, but still allow the top housing 120 to rotate freely with respect to the base member 110 (e.g., the base member 110 remains stationary as the top housing 120 is rotated).

Figure 4:
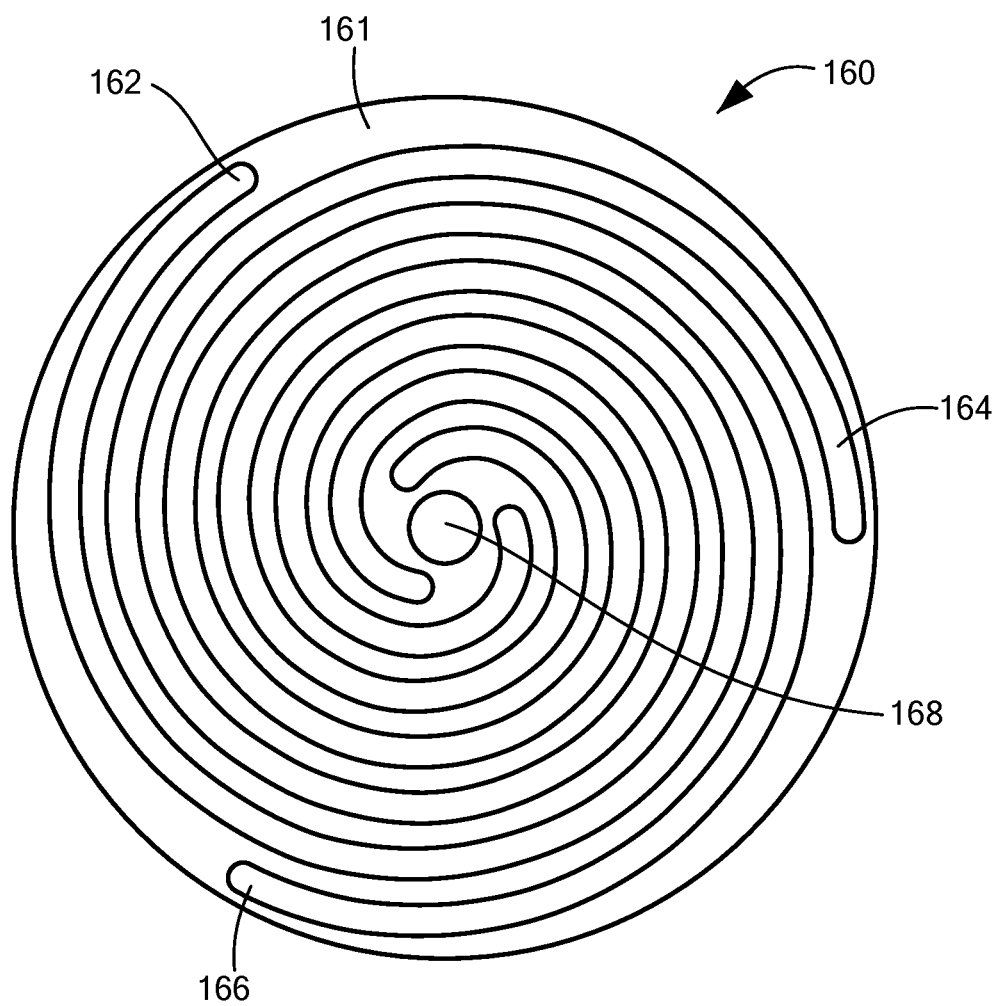
FIG. 4 schematically shows a spiral guide element of the jaw gripping device of FIG. 1, in accordance with various embodiments of the present invention.

Within the interior of the device 100 (e.g., between the base member 110 and the top housing 120), the device 100 includes a spiral guide member 160 that is secured to the base member 110. As best shown in FIG. 4, the spiral guide member 160 is a disk like member and has a plurality (e.g., one for each jaw member 140A/B/C) of spiral shaped guide channels 162/164/166 within the top surface 161 of the guide member 160. As discussed in greater detail below, the spiral guide member 160 and corresponding channels 162/164/166 interact with the jaw members 140A/140B/140C to cause the jaw members 140A/140B/140C to move radially inward and outward (e.g., toward and away from a jar/container placed on the device 100) as a user rotates the top housing 120. To allow the projection 122 of the top housing 120 to pass through spiral guide member 160, the guide member 160 may have a through hole 168 near the center. The through hole 168 should be large enough to allow the top housing 120 and the projection to freely rotate without interference from the guide member 160.

Figure 5A:
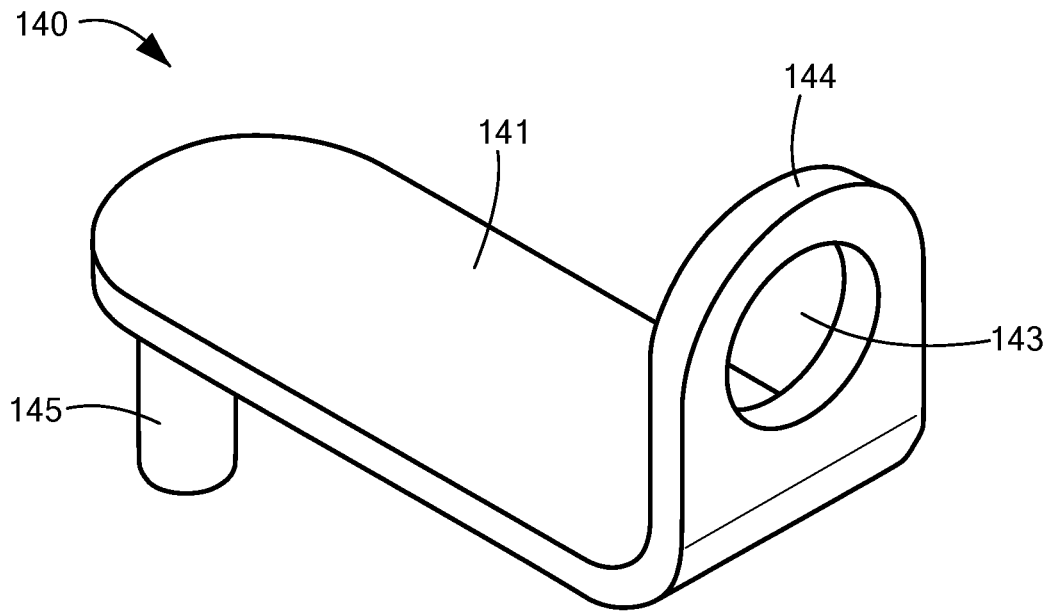
FIGS. 5A and 5B schematically show top and bottom perspective views of an exemplary jaw element, in accordance with embodiments of the present invention.

As mentioned above, to grasp the jar and hold it in place, the device 100 may include a number of jaw members 140A/140B/140C that, as discussed in greater detail below, reside within slots 150A/150B/150C in the top housing 120. The jaw members 140A/B/C are able to move back and forth within the slots (e.g., radially inward and outward with respect to the center of the top housing) in order to accommodate for various jar/container sizes. As shown in FIGS. 5A through 6D, each of the jaw members 140A/140B/140C may have a body portion 141 that defines the overall structure of the jaw member 140A/140B/140C. Extending upward from the body portion 141, the jaw member 140A/140B/140C may have an engagement face 144 that acts to contact/engage the jar/container to hold the jar/container in place. To increase the friction between the jaw member 140A/140B/140C and the jar/container, the engagement face 144 may include a resilient member 146 (FIGS. 1 and 5). For example, the engagement face 144 may have an opening 143 in which the resilient member 146 (FIGS. 1 and 5) may reside. Alternatively, the resilient member 146 may be secured to the engagement face 144 via adhesive or other securement method. As discussed in greater detail below, as the jaw members 140A/140B/140C begin to make contact with the jar/container, the resilient members 146 will begin to deform to more securely hold the jar/container in place.

To facilitate the interaction with each of the slots 150A/B/C, each of the jaw members 140A/140B/140C includes a ridge 147 along a length of the underside of the body portion 142. When assembled with the top housing 120, this ridge 147 sits within the slot 150A/B/C for the respective jaw member 140A/140B/140C. To secure the jaw member 140A/140B/140C to the top housing 120, the ridge 147 may include one or more threaded holes 149 in which a screw 148 (FIG. 3) may be threaded. As noted above, the jaw members 140A/140B/140C move radially inward and outward along the slots 150A/B/C. Therefore, the slots 150A/B/C and the ridge 147 should be sized to allow some clearance between the outer wall of the ridge 147 and the inner wall of the slot 150A/B/C. Additionally, when inserting the screw 148 into the threaded hole 149, the screw 148 should be left loose enough such that it does not bind the jaw 140A/B/C to the top housing 120 and prevent the jaw 140A/B/C from sliding.

Figure 5B:
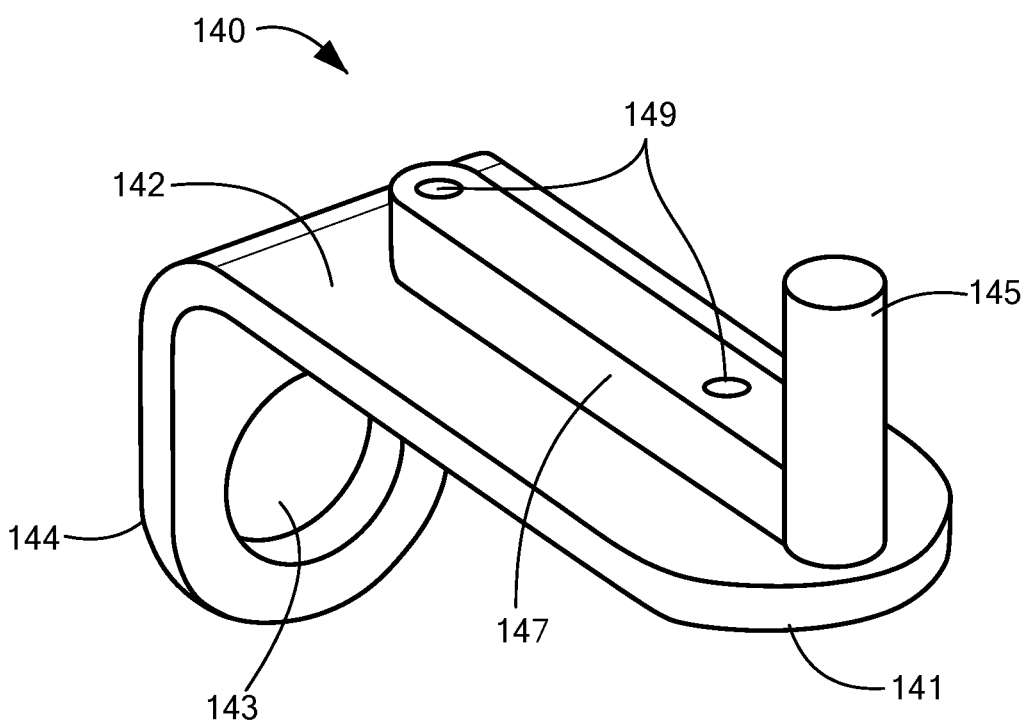
Figure 6A:
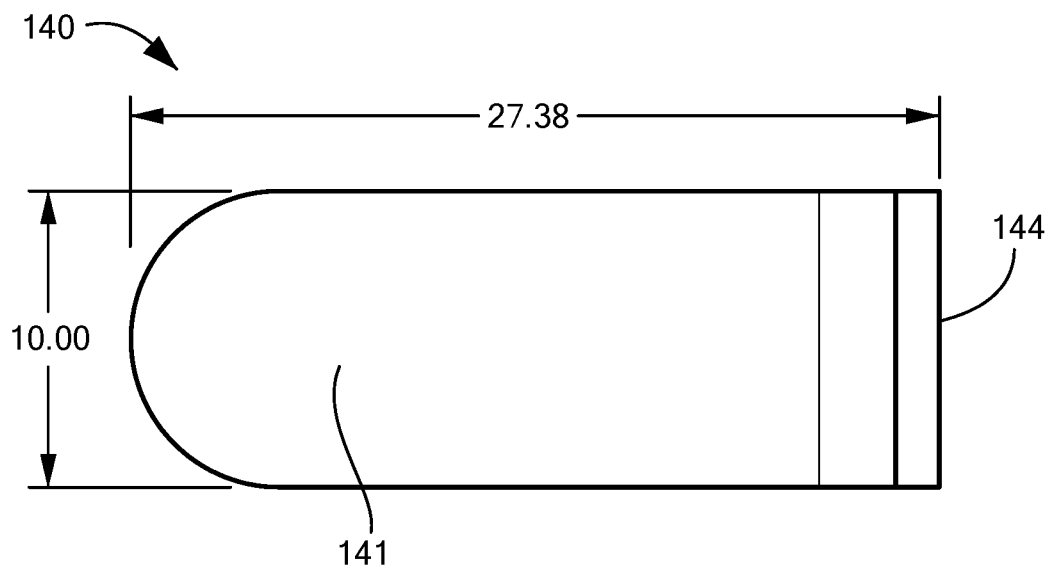
FIGS. 6A-6D schematically show top, front, bottom and side views of an exemplary jaw element, in accordance with embodiments of the present invention.
Figure 6B:
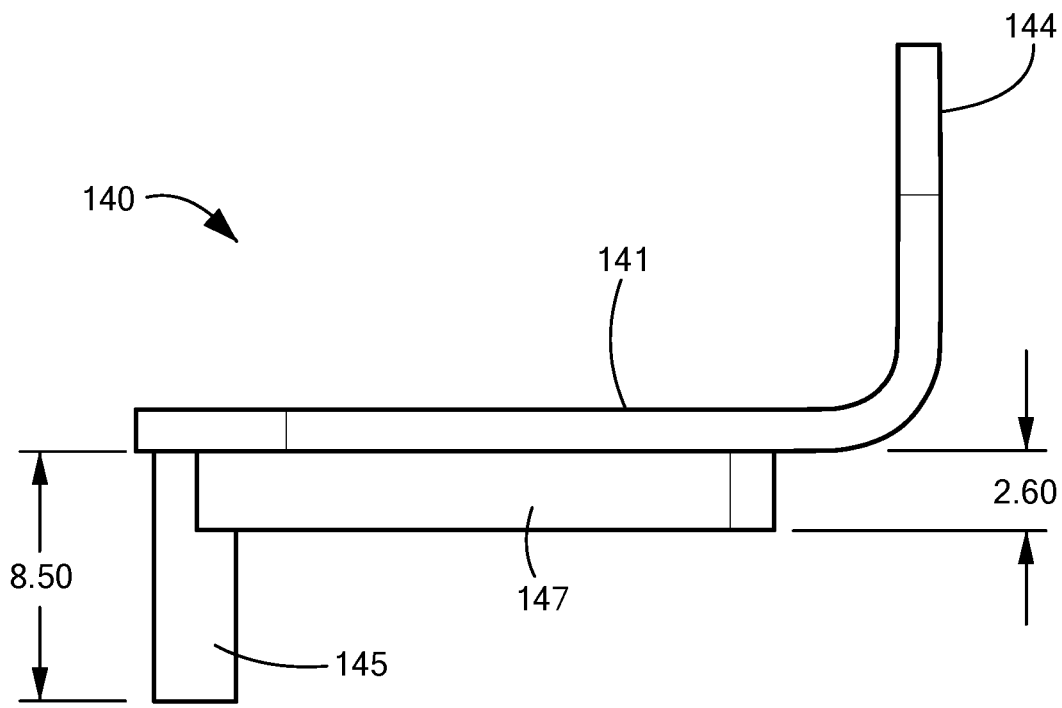
Figure 6C:
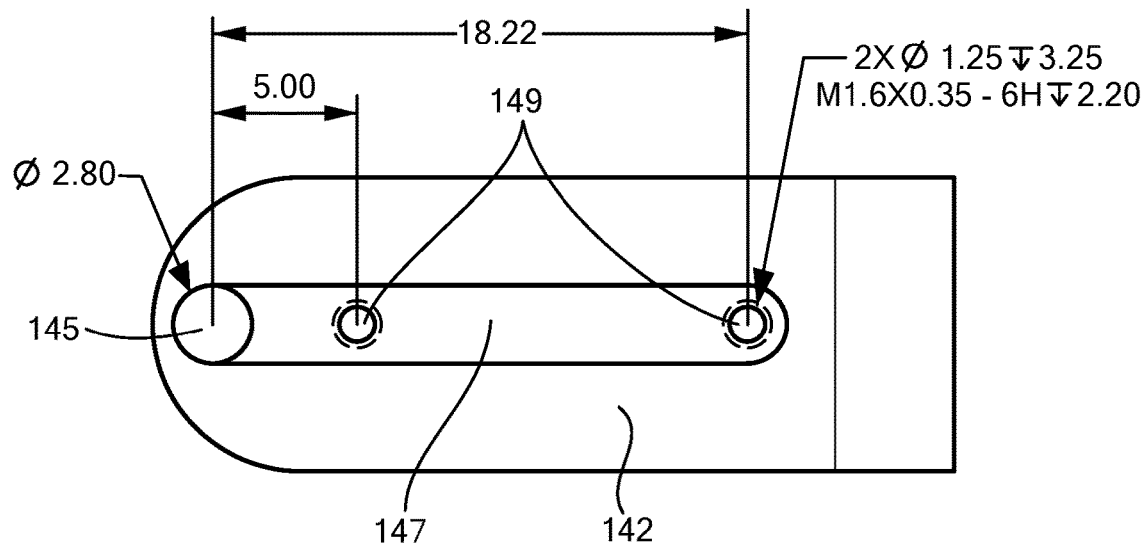
Figure 6D:
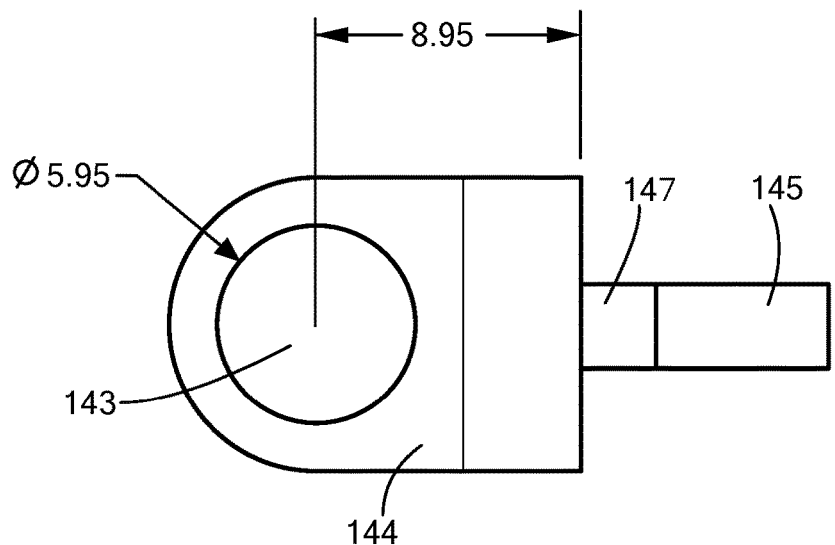

Also on the underside of the body portion 141, each of the jaw members 140A/B/C has a protrusion 145 (e.g., a post member) that extends downward from the jaw member 140A/B/C and through the slot 150A/B/C. As best shown in FIGS. 5A, 5B and 6B, the protrusion 145 extends further than the ridge 147. As discussed in greater detail below, the protrusion 145 of each of the jaw members 140A/B/B resides within one of the of spiral shaped guide channels 162/164/166 of the spiral guide member 160 to cause each of the jaw members 140A/B/C to move radially inward and/or outward during use. It should be noted that, although FIG. 1 shows a device 100 having three jaw members 140A/B/C, other embodiments may have more or less jaw members 140A/B/C. For example, some embodiments may have less than three jaw members 140A/B/C (e.g., two) or more than three jaw members 140A/B/C (e.g., four, five, six, etc.). Additionally or alternatively, not all of the jaw members 140A/B/C need to move as the top housing 120 rotates. For example, in some embodiments, only one or two of the jaw members (e.g., jaw members 140A and/or jaw members 140A and 140B) may move as the top housing 120 rotates.

During use, to adjust the location of the jaw members 140A/B/C, the user may rotate the top housing 120. As the top housing 120 rotates, the jaw members 140A/B/C (which as discussed above are secured to the top housing 120) will rotate with the top housing 120 and the protrusion 145 will move along within the respective guide channel 162/164/166 of the guide member 160. This, in turn, will cause the jaw members 140A/B/C to move radially inward or outward (e.g., within the slot 150A/B/C) with respect to the center of the device 100 (e.g., with respect to the axis of rotation) depending on the direction of rotation of the top housing 120. For example, if the top housing is moved in a first direction (e.g., counter clockwise), the protrusion 145 will follow the respective guide channel 162/164/166 toward the center of the spiral guide member 160 and the jaw members 140A/B/C will move radially inward (see FIG. 7 which shows the jaw members 140A/B/C moved partially inward after rotation of the top housing 120). Conversely, if the top housing 120 is moved in the opposite direction (e.g., clockwise), the protrusion 145 will follow the respective guide channel 162/164/166 away from the center of the spiral guide member 160 and the jaw members 140A/B/C will move radially outward (e.g., back to the position shown in FIG. 1).

It is important to note that, although the direction of rotation to move the jaw members 140A/B/C inward and outward may vary (e.g., in some embodiments a counter clockwise rotation may cause the jaw members 140A/B/C to move inward and in other embodiments a clockwise rotation may cause the jaw members 140A/B/C to move inward), is some embodiments it may be preferable to set the direction based on the rotational movement required to open and/or close the lid on the jar/container. For example, in order to ensure that the jaw members 140A/B/C do not loosen when twisting of the lid, in some embodiments, it may be preferable to set the direction of rotation to move the jaw members 140A/B/C radially inward (e.g., to tighten the jaw members 140A/B/C) to be counterclockwise. Therefore, in such embodiments, as the user begins to twist off the jar lid, any force applied to the device will only cause the jaw members 140A/B/C to tighten on the jar as opposed to loosen.

Figure 7:
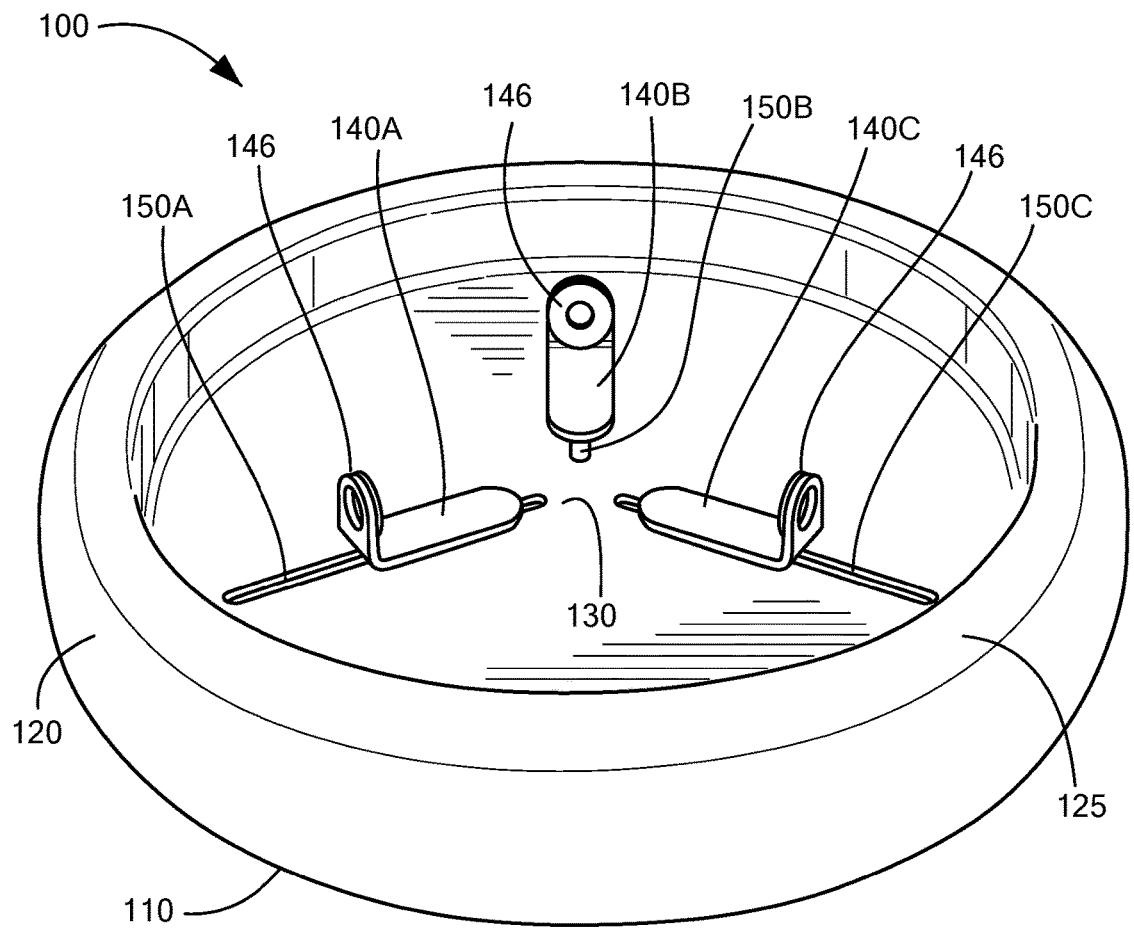
FIG. 7 schematically shows the jar gripping device of FIG. 1 with the jaw elements partially moved in, in accordance with embodiments of the present invention.
Figure 8:
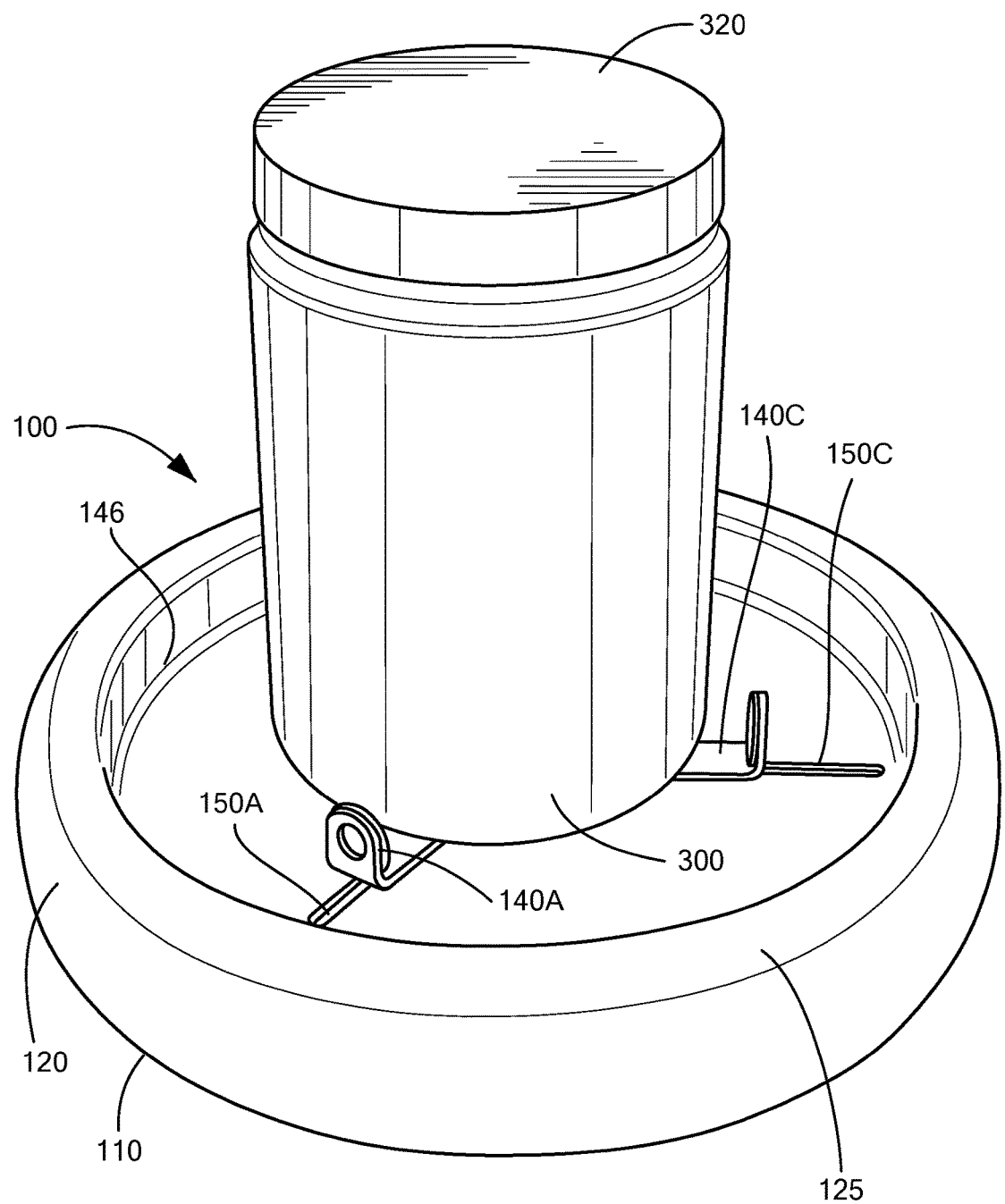
FIG. 8 schematically shows the jar gripping device of FIG. 1 with a jar placed on the device, in accordance with embodiments of the present invention.
Figure 9:
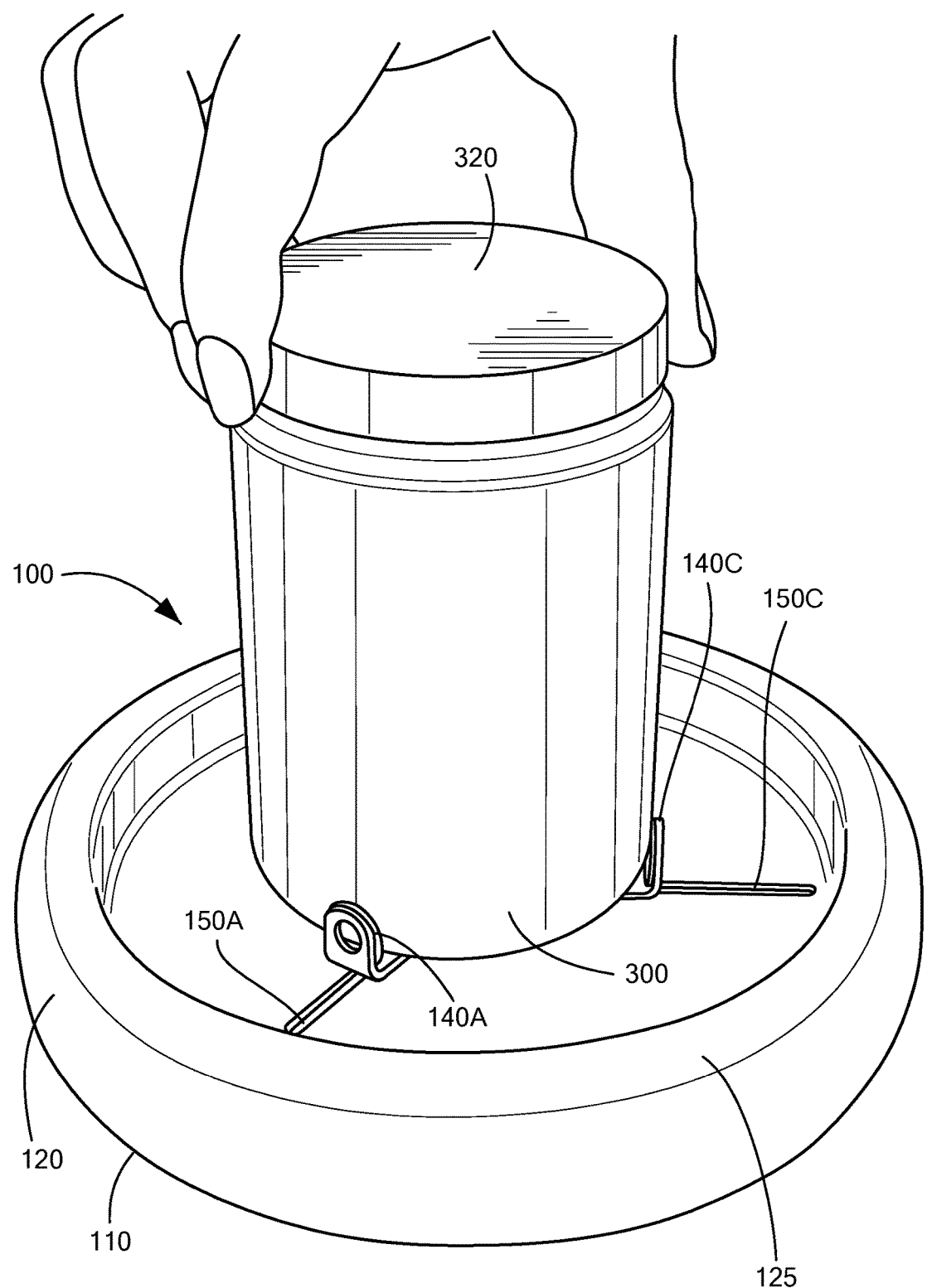
FIG. 9 schematically shows the jar gripping device of FIG. 1 with a jar placed on the device and held in place with a user opening the lid, in accordance with embodiments of the present invention.

FIGS. 7 through 9 show the device 100 at various stages of operation and use (e.g., to open a jar lid). As shown in FIG. 7, in order to minimize the amount the top housing 100 has to be rotated after placing the jar 300 on the device 100, the user may optionally rotate the top housing 120 to bring the jaw members 140A/B/C closer to the center of the device 100, but not so much as to prevent the jar 300 from being placed on the top housing surface 130. The user may then place the jar 300 on the surface 130 of the top housing 120 (FIG. 8) and continue rotating the top housing 120 until the jaw members 140A/B/C engage the base of the jar 300. In particular, when the jaw members 140A/B/C begin to engage the base of the jar 300, the resilient member 146 located on the engagement face 144 will contact the wall of the jar 300 and begin to deform. As the top portion 120 rotates further, the resilient members 144 will deform further until the jaw members 140A/B/C have a firm grasp on the jar 300. At this point, the jar 300 is secured in place, the jaw members 140A/B/C prevent the jar 300 from rotating, and the user is free to remove the lid to open the jar 300.

It should be noted that, because the device 100 securely grasps and holds the jar 300 and the device 100 remains stationary on the kitchen surface, the user is free to use one or both hands to remove the lid 310. This is particularly beneficial for individuals with arthritis and/or low dexterity as the user no longer needs to manipulate the jar 300 with one hand and turn the lid 310 with the other.

After removing the lid 310 from the jar 300, the user may simply reverse the process to remove the jar 300 from the device. For example, after the lid 310 is removed, the user may rotate the top housing 120 in the opposite direction (e.g., clockwise). This, in turn, will cause the jaw members 140A/B/C to disengage from the jar 300 and begin to move radially outward away from the center of the device 100 and the jar 300. Once the jaw members 140A/B/C are moved sufficiently far away, the user may then remove the jar 300 from the device to access to contents of the jar 300.

Figure 10A:
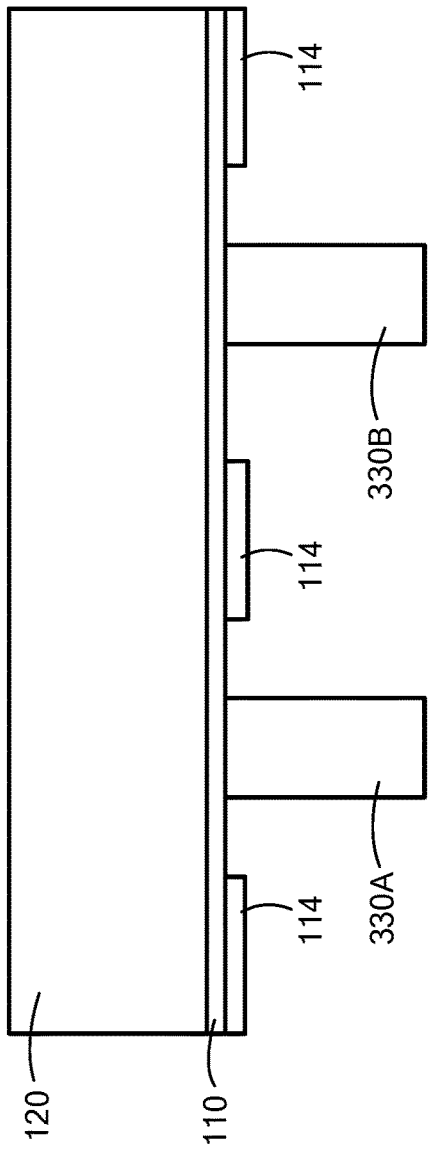
FIGS. 10A to 10D schematically show an alternative jar gripping device, in accordance with additional embodiments of the present invention.
Figure 10B:
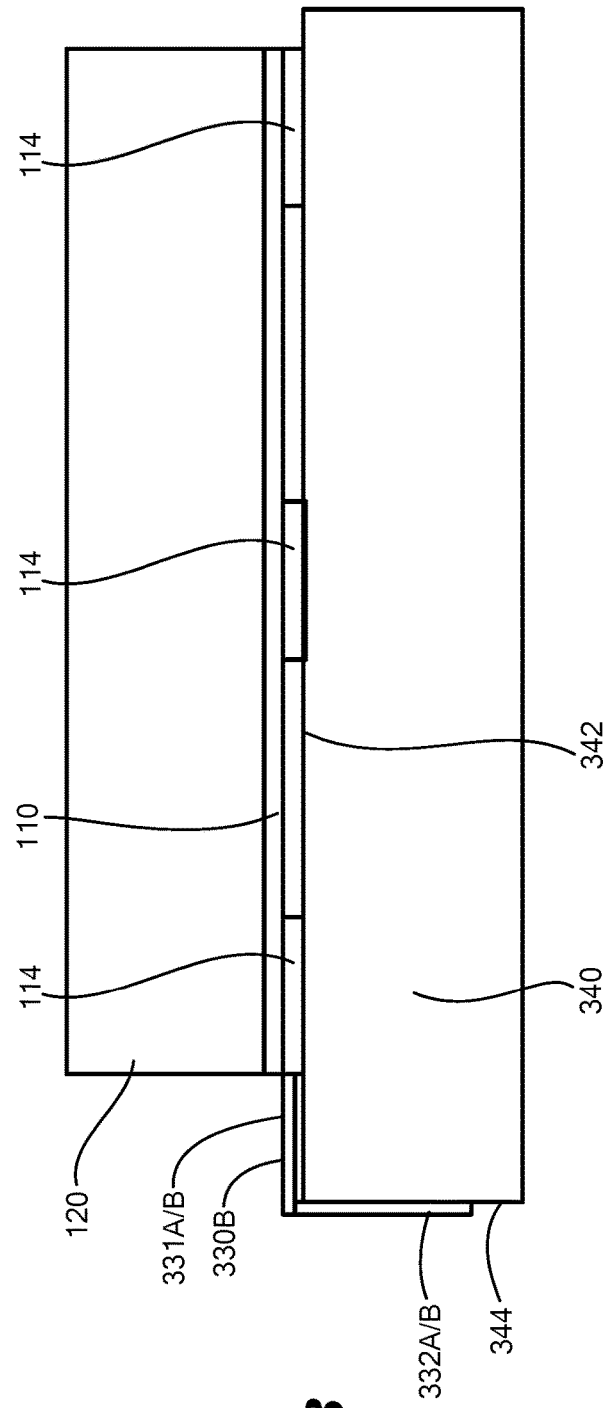
Figure 10C:
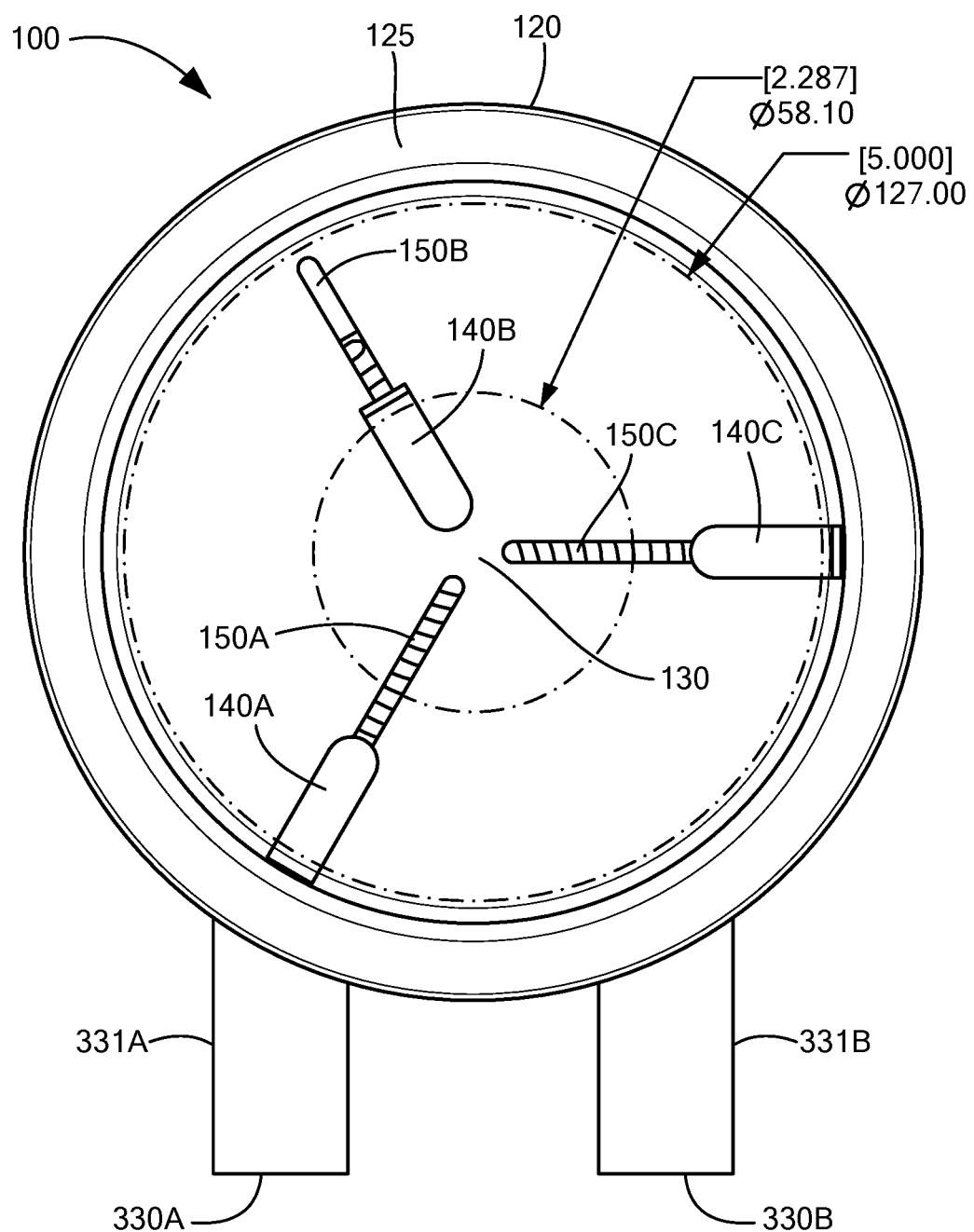

FIGS. 10A through 10D show an alternative embodiment of the jar gripping and securing device 100 with additional structures to aid in stabilizing the device 100 on surface (e.g., the kitchen surface/counter) during use. In particular, as shown in FIGS. 10A through 10C, the device 100 may have leg members 330A/330B that extend out and downward from the base 110. For example, each of the leg members 330A/330B may have a horizontal portion 331A/B and a vertical portion 332A/B. The horizontal portion 331A/B extends out from the base 110 and lies along the top 342 of the surface 340 (e.g., the kitchen counter) on which the device 100 sits. The vertical portion 332A/B contacts the edge 344 of the surface 340. In this manner, the horizontal portion 331A/B of the leg members 330A/330B allow the device 100 (e.g., the base 110 and top housing 120) to be located away from the edge 344, while the vertical portions 332A/B engage the edge 344 of the kitchen surface (e.g., the edge of the countertop) during use to prevent the device 100 from slipping and/or rotating (e.g., when the top housing 120 is rotated and/or the jar lid 320 removed).

For example, in embodiments containing the leg members 330A/330B, when the top housing 120 is rotated in a clock-wise direction, leg member 330A (e.g., the vertical portion 332A) will be forced against the edge 344 of the countertop 340 to prevent the device 100 from rotating. Conversely, when the top housing 120 is rotated in the counter clockwise direction (or the lid 320 is being removed), leg member 330B (e.g., vertical portion 332B) will be forced against the edge 344 of the countertop 340 to prevent the device 100 from rotating. It should be noted that, to further prevent the device 100 from rotating, the user may position their body against the non-engaging leg member (e.g., leg member 330B during clockwise rotation and leg member 330A during counter clockwise rotation) to hold the device 100 against the edge of the surface/counter. To prevent damage to the surface 340 (e.g., the top 342 and/or the edge 344 of the surface 340), the leg members 330A/330B may include padding (not shown) on the leg surfaces contacting the countertop/surface 340.

Figure 10D:
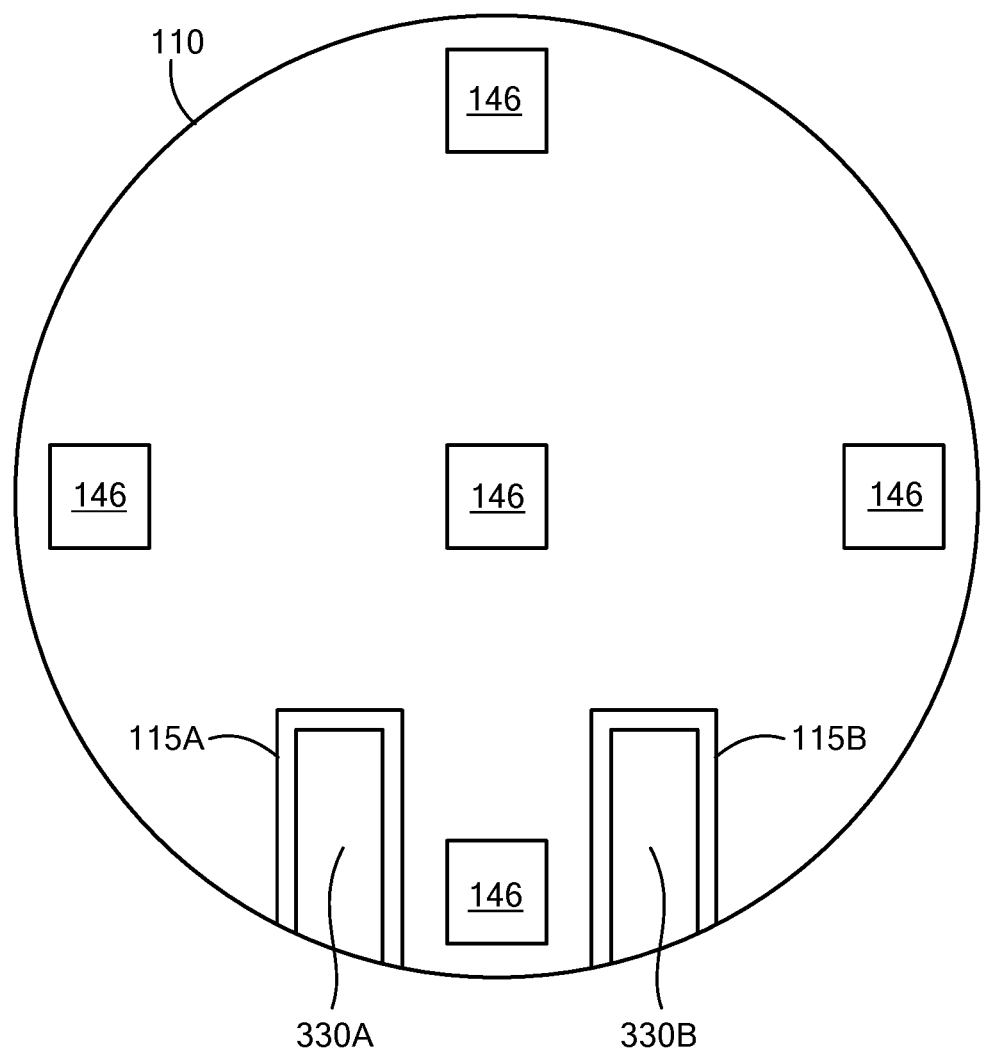

To prevent the leg members 330A/330B from accidentally being damaged and allow the device 100 to be easily moved (e.g., away from the edge of the counter), in some embodiments, the leg members 330A/330B may be removable and/or retractable. For example, the legs members 330A/330B may be clipped on and off the base 110 as needed. Alternatively, as shown in FIG. 10D, the base 110 may include recessed areas 115A/B into which the leg members 330A/330B may fold-up and/or retract. In such embodiments, the leg members 330A/330B may be spring loaded such that they automatically retract into the recessed areas 115A/B and may include a hinge between the horizontal portions 331A/331B and vertical portions 332A/332B to allow the leg members 330A/B to be folded out. To that end, when the user wishes to use the device 100, they may pull the leg members 330A/B out from the recessed areas 115A/B, fold out the vertical portions 332A/332B and place the device 100 on the counter 340 such that the vertical portions 332A/332B engage the edge 342 of the counter and the horizontal portions 331A/B rest on the top surface of the counter 340. Conversely, when the user is done and seeks to move or put the device away (e.g., within a drawer), the user may simply lift the device 100 and the spring will cause the leg members 330A/B to automatically retract into the recessed areas 115A/B.

Figure 11A:
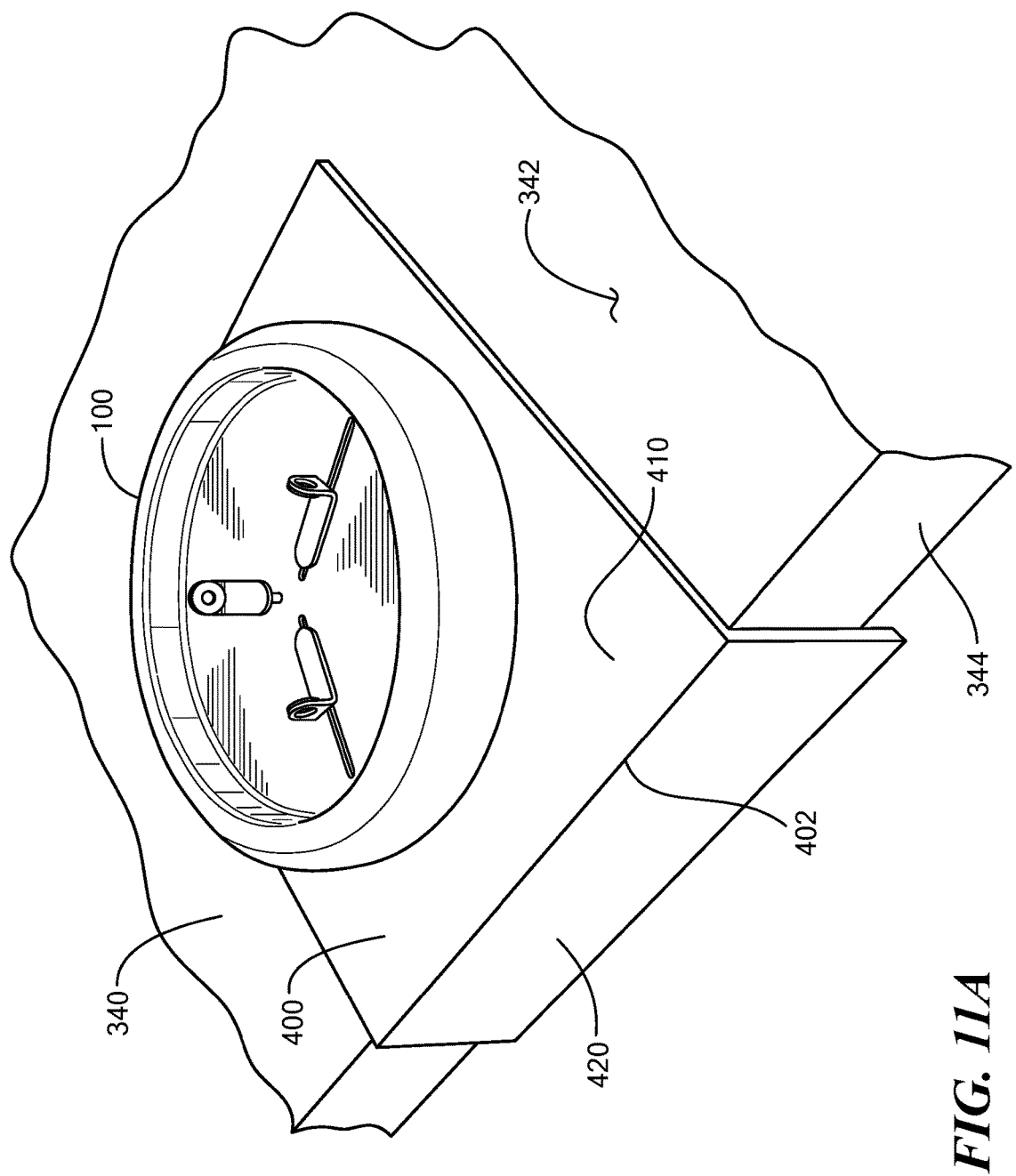
FIGS. 11A to 11C schematically show a jar gripping device with an alternative counter brace, in accordance with additional embodiments of the present invention.
Figure 11B:
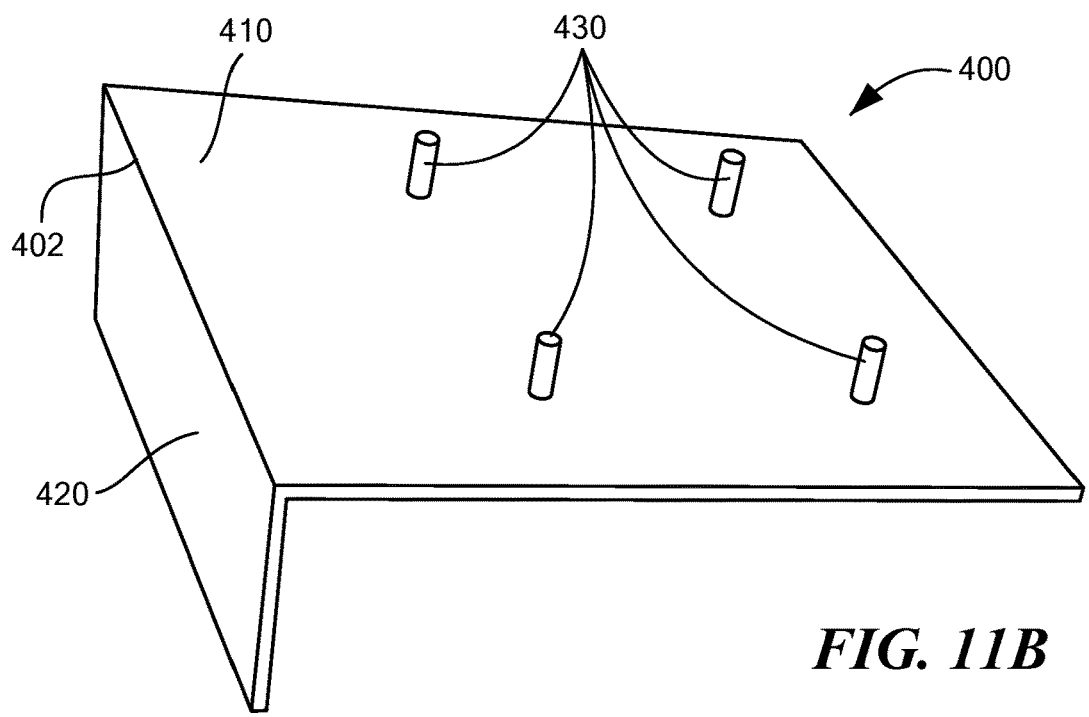
Figure 11C:
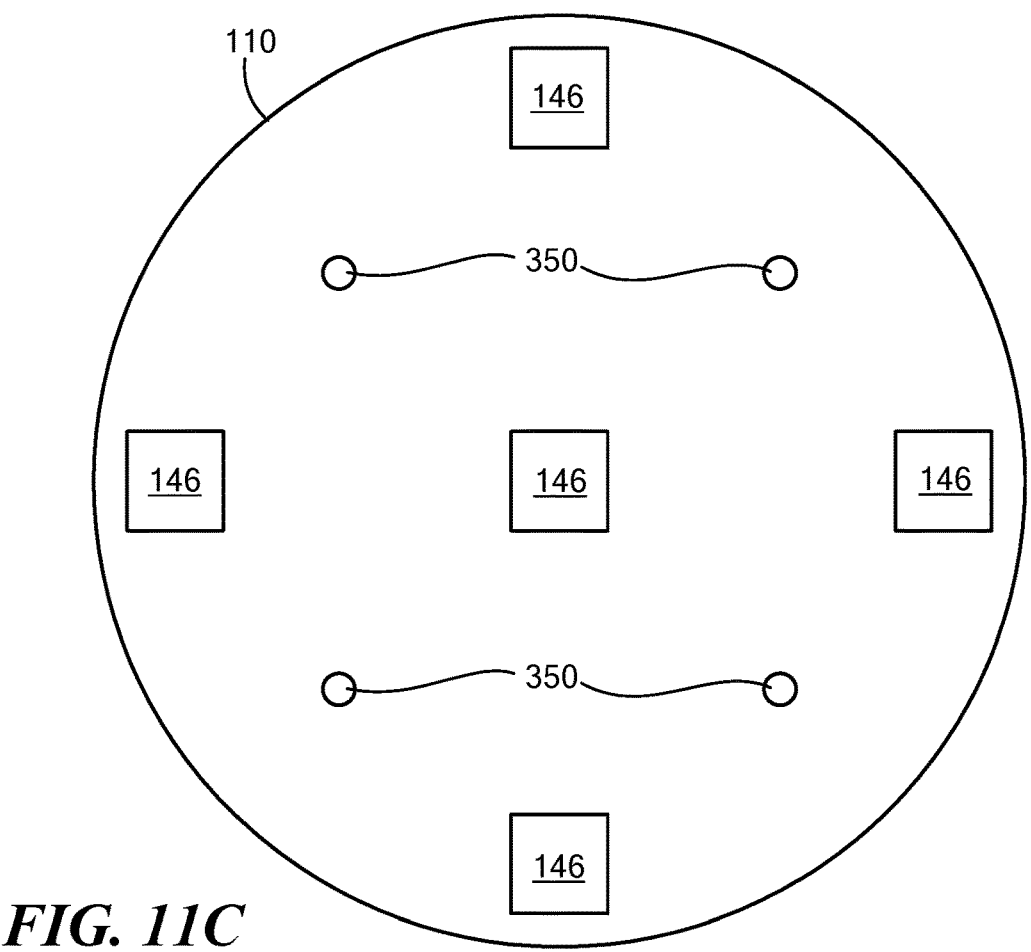

FIGS. 11A to 11C schematically show a jar gripping device with an alternative counter brace 400 for stabilizing the device 100 on the counter 340. As shown, the counter brace 400 may be an L-shaped structure that secures to the base 110 of the device 100. The brace 400 may be made from any number of rigid materials, for example, a rigid plastic, wood, metal, etc. and may be removably secured to the base 110 (e.g., so that it can be removed when the device 100 is not in use) or permanently secured to the base 110. Like the leg members 330A/B discussed above, during use, the horizontal portion 410 of the brace 400 may rest on the top surface 342 of the counter 340 and the vertical portion 420 of the brace 400 may rest against/engage the edge 344 of the counter 340 to keep the device 100 stationary while the top housing 120 is rotated and/or the jar lid 320 is being removed. To protect the counter 340 from damage, both the horizontal and vertical portions of the brace 400 may include padding.

To secure the brace 400 to the device, the brace 400 may include a number of post members 430 that extend up from horizontal surface 410 of the brace 400. Additionally, the base 110 of the device 100 may include a number of holes 350 (FIG. 11C) that correspond to each of the post members 430. Therefore, to secure the brace 400 to the device 100, the user may simply place the device 100 onto the brace 400 such that each of the post members 430 enters a respective hole 350 in the base 100. It should be noted that the post members 430 and the holes 350 may have smooth surfaces (e.g., they are not threaded) such that the post members 430 can easily slide into and out of the holes 350 as needed. Alternatively, the post members 430 and the holes 350 may be threaded. In such embodiments, to secure the brace 400 to the device 100, the user may thread/screw the post members 430 into each of the holes 350.

It should be noted that, although the brace 400 may be rigid in some embodiments, other embodiments may include a hinge 402 (FIG. 11B) located between the horizontal portion 410 and the vertical portion 420 to allow the brace 400 to be folded and stored more easily. For example, the brace 400 can include a standard hinge(s), low-profile hinge(s), or living hinge(s) between the horizontal portion 410 and the vertical portion 420. To that end, when the device 100 is not in use, the user may remove the brace 400, fold it up, and store the brace 400 in a drawer, for example.

It is also worth noting that, although FIGS. 11A to 11C show the post members 430 extending up from the brace 400 and into the device 100, other configurations are possible. For example, in some embodiments, the post members may extend down from the device 100 (e.g., from the base 110) and into holes within the brace 400 (e.g., within the horizontal portion 410). However, in such embodiments, it is preferable that the post members do not extend too far from the base 110 to ensure that the device 100 can sit flat on the counter 340 when secured to the brace 400. To that end, it may be preferable that the length of the post members extending down from the base 100 not exceed the thickness of the horizontal portion 410 of the brace 400 to ensure that the post members do not poke out from the bottom of the horizontal portion 410.

It is important to note that the overall size of the device 100 should be balanced against the range of jar 300 sizes that the device 100 is most likely to encounter and the counter space that the device 100 will take up. For example, the device 100 should be large enough to accommodate most typical jar sizes (e.g., 1.5" diameter to 5" diameter jars) but not so large as to take up a large amount of counter space and/or not be able to fit into a drawer. Additionally or alternatively, when not being used to open jars 300, the device 100 may be used to hold other objects such as, but not limited to, vases, fruit bowls, decorative dishes, etc. In this manner, even when the device 100 remains on the countertop, the space occupied by the device 100 is not wasted.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. An apparatus for grasping a container and aiding in unscrewing a lid that is secured to the container by a right-hand thread, the apparatus comprising:
   a base element configured to be placed on a surface;
   a top housing rotatably secured to the base element and configured to rotate about an axis with respect to the base element, the top housing having a flat surface for receiving the container and a raised outer periphery, the raised outer periphery configured to provide a surface for grasping the apparatus and rotating the top housing relative to the base element;
   a spiral guide element located between the base element and the top housing, the spiral guide element including a plurality of interleaved spiral grooves, each groove having an origin proximate to the axis and configured to occupy, about the axis, an angular extent of greater than 360 degrees;

a plurality of jaw members moveably secured to the top housing, each of the plurality of jaw members having a protrusion located within a different one of the plurality of spiral grooves and configured to move along its corresponding spiral groove;

wherein the spiral grooves are configured so that, rotation of the top housing about the axis in a counterclockwise direction, as viewed from above, causes the jaw members to move radially inward to engage the container, so that application of a torque to the lid, in a counterclockwise direction, as viewed from above, to unscrew the lid tends to cause the top housing itself to rotate in the counterclockwise direction so as to tighten the jaw members against the container.

2. An apparatus according to claim 1, further comprising:
at least one engagement member located on the base element and configured to engage the surface, thereby holding the apparatus in place during rotation of the top housing.

3. An apparatus according to claim 2, wherein the at least one engagement member includes a plurality of feet members located on an underside of the base element, the feet members configured to contact the surface.

4. An apparatus according to claim 3, wherein the plurality of feet members are further configured to increase the friction between the apparatus and the surface, thereby holding the apparatus in place during rotation of the top housing.

5. An apparatus according to claim 2, wherein the engagement members are suction cups, the suction cups configured to suction to the surface.

6. An apparatus according to claim 2, wherein the engagement members are vacuum cups, the vacuum cups configured to suction to the surface.

7. An apparatus according to claim 1, further comprising:
at least one leg member extending from the base element and configured to engage an edge of the surface during rotation of the top housing.

8. An apparatus according to claim 7, wherein the at least one leg member is further configured to engage the edge of the surface during removal of a lid from the container.

9. An apparatus according to claim 7, wherein the at least one leg member includes a first leg member and a second leg member, the first leg member nearer a first end of the base element, the second leg member located nearer a second end of the base element.

10. An apparatus according to claim 9, wherein the first leg element is configured to engage the edge of the surface during rotation of the top housing in a first direction, the second leg member configured to engage the edge of the surface during rotation of the top housing in a second direction.

11. An apparatus according to claim 1, wherein each jaw member includes a body portion, the protrusion extending from a bottom of the body portion.

12. An apparatus according to claim 1, wherein the spiral element includes an opening extending there through, the top housing having a protrusion extending downward and through the opening, thereby allowing the top housing to rotate about the axis and with respect to the spiral guide element and the base member.

13. An apparatus according to claim 1, wherein each jaw member includes a resilient member, the resilient member grasping the base of the container.

14. An apparatus according to claim 1, wherein the top housing includes a plurality of slots extending through the top housing, each of the protrusions extending through one of the plurality of slots and into the at least one spiral groove.

15. An apparatus according to claim 1, wherein the at least one spiral groove includes a plurality of spiral grooves, the protrusion from each of the plurality of jaw members located in adedicated spiral groove.

16. An apparatus according to claim 1, wherein each spiral groove wraps around the axis at least once.

17. An apparatus according to claim 1, further comprising a brace member removably secured to the base element, the brace member including a horizontal portion configured to rest on the surface and a vertical portion configured to engage the edge of the surface, thereby preventing rotation of the device during use.

18. An apparatus according to claim 17, wherein the brace member includes at least one post member extending from the horizontal portion and into at least one hole in the base element when the brace member is secured to the device.

19. An apparatus according to claim 18, wherein the brace member further includes a hinge between the horizontal portion and the vertical portion, the hinge configured to allow the horizontal portion and vertical portion to move relative to one another.

20. An apparatus according to claim 1, wherein each spiral groove wraps around the axis at least twice.

* * * * *

UNITED STATES PATENT AND TRADEMARK OFFICE
CERTIFICATE OF CORRECTION

PATENT NO. : 10,464,794 B2
APPLICATION NO. : 15/296479
DATED : November 5, 2019
INVENTOR(S) : Romek Figa It is certified that error appears in the above-identified patent and that said Letters Patent is hereby corrected as shown below:

In the Claims

In Column 10, Line 26:
Replace "adedicated"
With --a dedicated--

Signed and Sealed this
Seventh Day of January, 2020

Andrei Iancu
*Director of the United States Patent and Trademark Office*